United States Patent
Darner et al.

(10) Patent No.: US 9,903,426 B1
(45) Date of Patent: Feb. 27, 2018

(54) BRAKE ACTUATOR APPARATUS FOR SHIELDING AND CENTERING

(71) Applicant: Bendix Spicer Foundation Brake LLC, Elyria, OH (US)

(72) Inventors: Brett S Darner, Wellington, OH (US); Zeeshan Phansopkar, Elyria, OH (US); Ronald S Plantan, Mooresville, NC (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 15/226,954

(22) Filed: Aug. 3, 2016

(51) Int. Cl.
  *B60T 17/00* (2006.01)
  *F16D 65/00* (2006.01)
  *F16D 65/14* (2006.01)

(52) U.S. Cl.
  CPC ......... *F16D 65/0025* (2013.01); *F16D 65/14* (2013.01)

(58) Field of Classification Search
  CPC ....... B60T 17/083; B60T 17/088; F16D 65/28
  USPC ....... 188/153 D, 170, 322.16–322.18; 92/48, 92/63, 130 A, 130 R
  See application file for complete search history.

(56) References Cited

U.S. PATENT DOCUMENTS

| | | | |
|---|---|---|---|
| 4,164,273 A | 8/1979 | McElroy | |
| RE33,715 E * | 10/1991 | Miura | F16F 9/364 188/315 |
| 5,320,026 A | 6/1994 | Pierce | |
| 5,392,691 A * | 2/1995 | Schultz | B60T 17/083 277/549 |
| 6,267,043 B1 | 7/2001 | Plantan | |
| 6,318,240 B1 | 11/2001 | Plantan | |
| 6,325,187 B1 * | 12/2001 | Boucher | F16F 9/36 188/322.17 |
| 6,354,187 B1 | 3/2002 | Plantan | |
| 6,394,462 B1 | 5/2002 | Constantinides | |
| 6,480,107 B2 | 11/2002 | Stonehocker | |
| 6,729,224 B1 * | 5/2004 | Roy | B60T 17/083 384/24 |
| 8,079,598 B2 * | 12/2011 | Murakami | F16F 9/363 188/322.17 |

(Continued)

OTHER PUBLICATIONS

Haldex AB, "Durability and Reliability Mile after Mile Performance," Advertisement, Oct. 2015, 6 pages, Haldex, United States of America.

(Continued)

*Primary Examiner* — Christopher P Schwartz
(74) *Attorney, Agent, or Firm* — Cheryl L. Greenly; Brian E. Kondas; Eugene E. Clair

(57) ABSTRACT

A brake actuator comprises a housing having an end wall and a pushrod projecting through an opening in the end wall and terminating at a movable plate in the housing. A spring is enclosed in the housing and surrounds the pushrod. At least one unitary resilient member is disposed on the push rod proximate to the end wall and partially extends through the opening for centering the spring around an axis of the pushrod and restricting contamination into the housing. The unitary resilient member comprises a central aperture and an annular flange surrounding the central aperture. At least one section of a collar radially outward from the annular flange has a thickness less than half of the annular flange thickness for constraining movement of the spring and the push rod in a radial direction.

16 Claims, 6 Drawing Sheets

(56) References Cited

U.S. PATENT DOCUMENTS

| | | |
|---|---|---|
| 8,789,664 B2 | 7/2014 | Fantazi |
| 2005/0067242 A1* | 3/2005 | Vanmechelen ....... F16F 9/3242 |
| | | 188/322.17 |
| 2009/0191999 A1 | 7/2009 | Joseph |
| 2012/0006192 A1 | 1/2012 | Rhoads |
| 2013/0075206 A1 | 3/2013 | Plantan |
| 2013/0239798 A1* | 9/2013 | Plantan ................ B60T 17/083 |
| | | 92/63 |
| 2014/0117628 A1* | 5/2014 | Jang ........................ B60T 7/107 |
| | | 277/589 |

OTHER PUBLICATIONS

Bendix Spicer Foundation Brake LLC, "Bendix Eversure Spring Brake with No Touch Technology," Service Data Sheet SD-02-4525, May 2015, 8 pages, Bendix Spicer Foundation Brake LLC, United States of America.

\* cited by examiner

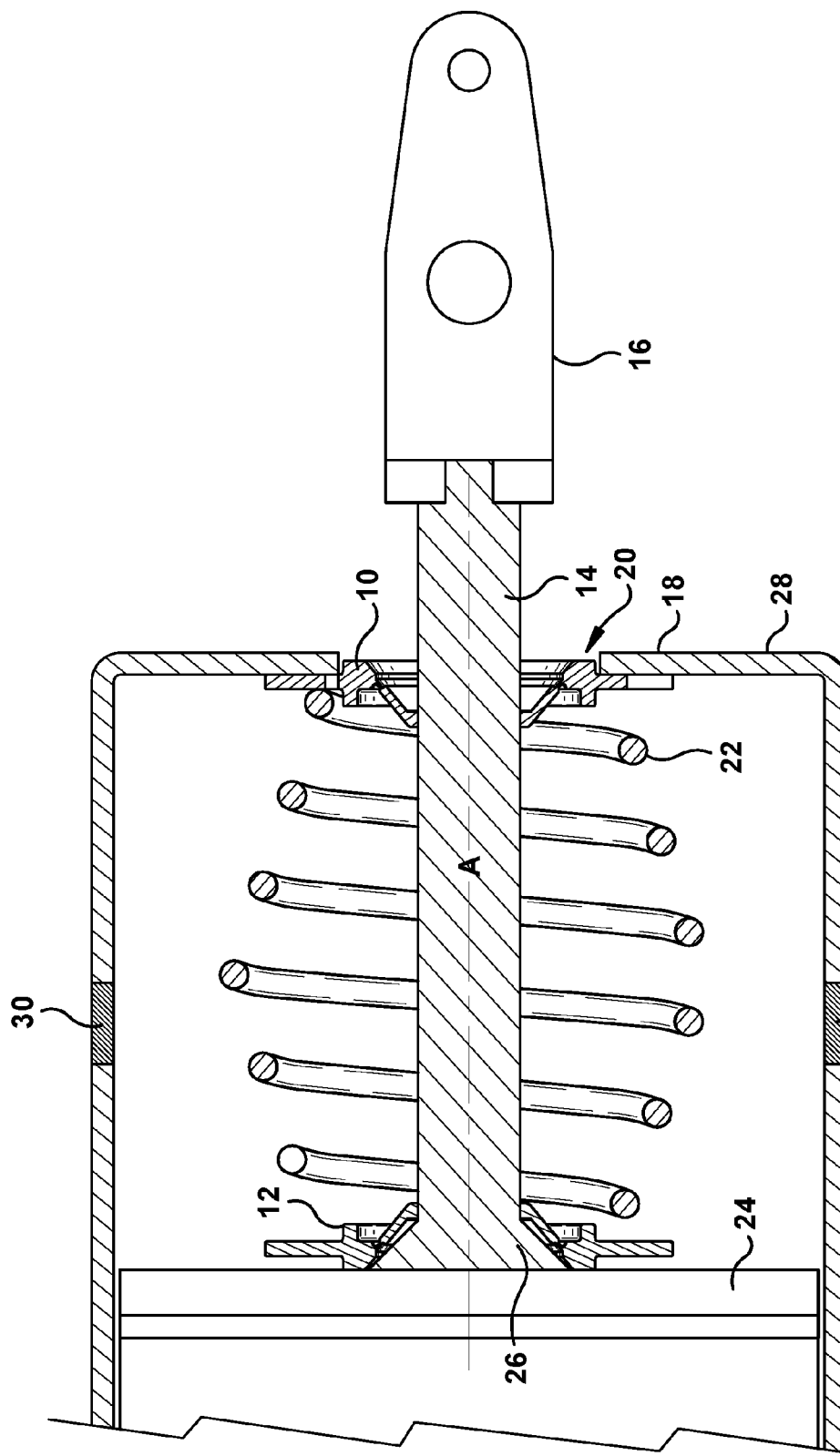

BRAKE ACTUATOR APPARATUS FOR SHIELDING AND CENTERING

BACKGROUND

The present invention relates to embodiments of an apparatus for shielding the interior of a brake actuator from debris and for centering the push rod in a brake actuator chamber. Typically, a shield operates as a barrier to block entry of contaminants that might otherwise pass from outside an actuator housing, through a gap between a pushrod outer circumference and an opening in an actuator wall and into an interior of the actuator housing. In such an arrangement, the shield commonly has an inner diameter surrounding the articulating pushrod at the very location at which side loading of the pushrod occurs. For most rigid shields, shield inner diameters have been accepted as load bearing interfaces. In such a construction, if the inner diameter of a shield is compromised by side loading, the shield may no longer operate effectively. In addition, if the return spring is not centered in the actuator housing, it will skew the push rod in the housing, causing excessive wear on the diaphragm and chamber body. Therefore, there is a need for an improved shield for a brake actuator and centering device for the pushrod of the brake actuator.

SUMMARY

Various embodiments of a brake actuator apparatus for centering and shielding comprise a housing having an end wall and a pushrod having an axis and projecting through an opening in the end wall and terminating at a movable plate located in the housing. The brake actuator comprises a spring enclosed in the housing and surrounding the pushrod and at least one resilient member for constraining movement of the spring and the push rod in a radial direction, centering the spring around the axis of the pushrod and restricting contamination into the housing.

In accordance with another aspect, various embodiments of a unitary resilient member for a brake actuator comprise a central aperture and an annular flange surrounding the central aperture. At least one section of a collar radially outward from the annular flange has a thickness less than half of the thickness of the annular flange for constraining movement of the first resilient member in a radial direction.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 1 illustrates a view of a brake chamber having two resilient members according to one example of the invention.

DETAILED DESCRIPTION

Figure 2A:
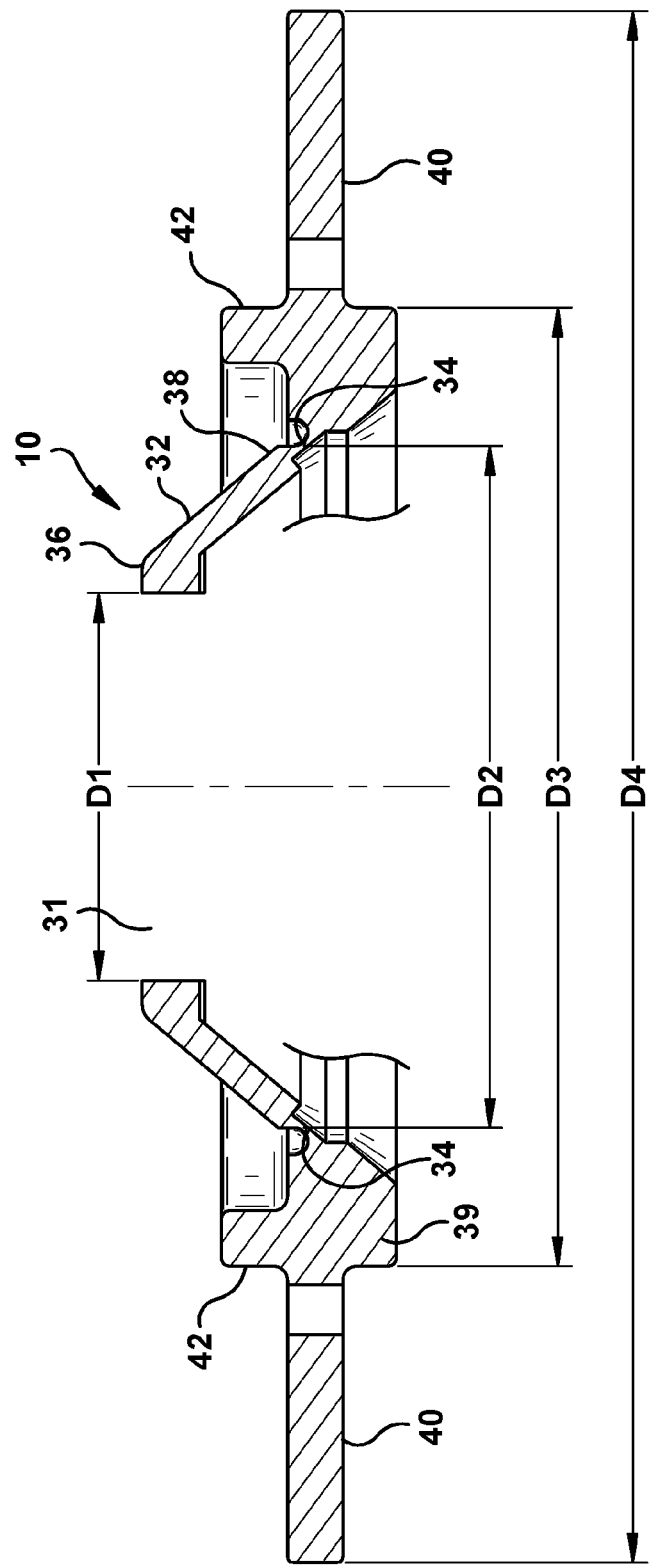
FIG. 2A illustrates a cross section view of a resilient member according to one example of the invention.

FIG. 1 illustrates a partial cutaway view of a brake actuator having a first resilient member 10 and a second resilient member 12, according to one example of the invention. The brake actuator has a housing 18. The housing 18 may be part of a service side if the brake actuator is a tandem parking brake/service brake actuator or the housing 18 may be part of a service chamber if the brake actuator is a service brake actuator only. The resilient members 10, 12 are shown as identical shapes in FIG. 1, but the resilient members may be different shapes, as will be described later.

The housing 18 has ventilation openings 30 providing for communication between the interior of the housing 18 and atmosphere.

The brake actuator includes a pushrod 14 having an axis A. A yoke 16 is secured to distal end of the pushrod 14. The yoke 16 is connected to a slack adjuster of a drum brake assembly or to some other brake operating element (not shown). The proximate end of the pushrod 14 is shaped with a wide angled portion that is welded or otherwise attached to a movable plate 24.

The housing 18 includes an end wall 28. The distal end of the pushrod 14 projects through an approximate central opening 20 in the end wall 28 for axial reciprocation produced by supply and exhaust of pressurized air from a service brake pressure volume of the brake actuator (not shown). The resilient member 10 operates as a barrier, preventing entry of contaminants that might pass from the exterior of the housing 18 through a gap between the outer surface of the pushrod 14 and the edge of the opening 20 in the end wall 28 and into an interior of the housing 18.

A biasing member 22 is enclosed in the housing 18 and surrounds the push rod 14 between the movable plate 24 and the end wall 28. The biasing member 22 may be a barrel type spring or other type of spring. The use of a barrel spring instead of a coil spring eases installation concerns because, unlike a conical spring, the barrel spring cannot be accidentally installed in a reverse position. Resilient member 12 is held by the biasing member 22 against the surface of the plate 24 and resilient member 10 is held by the biasing member 22 against the interior of the end wall 28. Side loading of the biasing member 22 is minimized as the ends of the biasing member 22 are seated on piloting ridges of the resilient members 10, 12. The piloting ridges center the biasing member 22 with the opening 20 both during installation and operation of the brake actuator and thereby inhibit the push rod 14 from reciprocating off of axis A.

The resilient members 10, 12 are floating, deformable elements provided with at least one thinned section at an inner diameter. The thinned sections allow motion of the push rod 14 along the axis A while limiting motion in a circumferential direction around the axis A. Additional detail of the resilient members 10, 12 is shown in FIGS. 2A, 2B and 2C.

Therefore, a brake actuator comprises a housing having an end wall and a pushrod having an axis and projecting through an opening in the end wall and terminating at a movable plate located in the housing. The brake actuator comprises a spring enclosed in the housing and surrounding the pushrod and at least one resilient member for constraining movement of the spring and the push rod in a radial direction, centering the spring around the axis of the pushrod and restricting contamination into the housing.

Figure 2B:
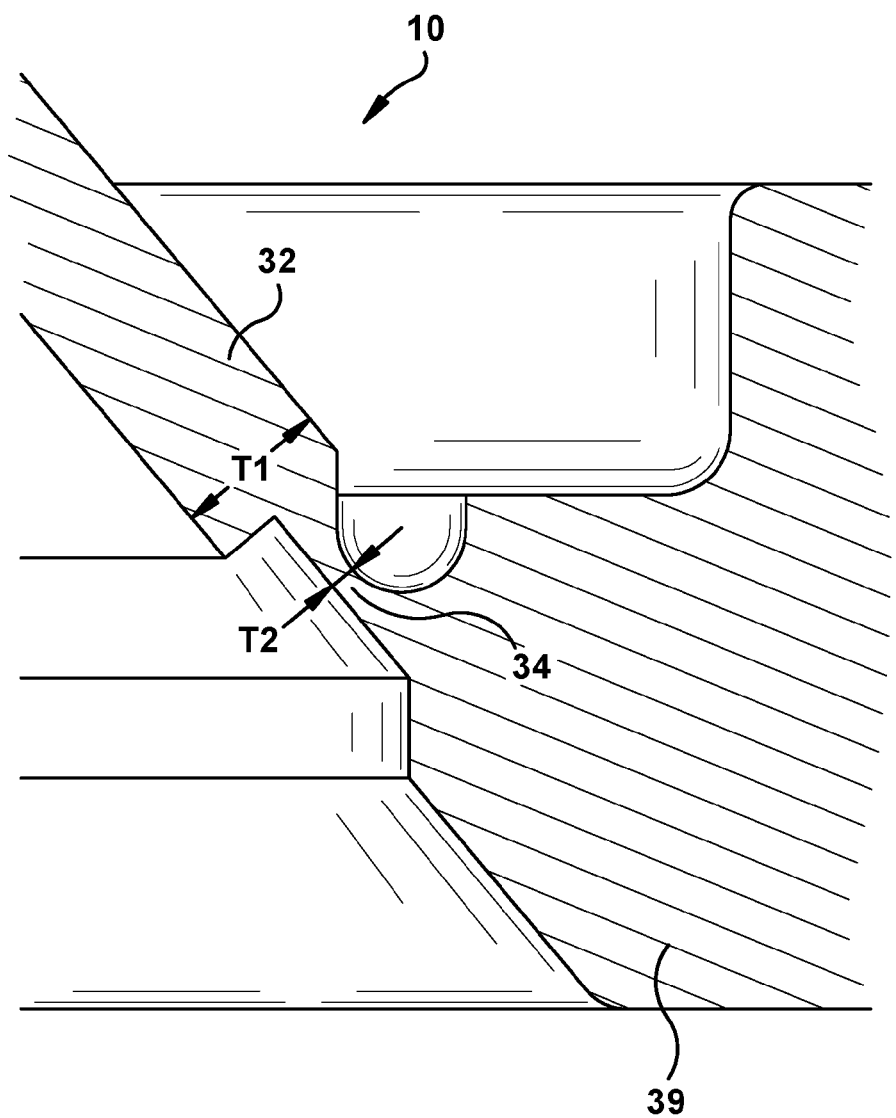
FIG. 2B illustrates an exploded view of one section of the resilient member of FIG. 2A.
Figure 2C:
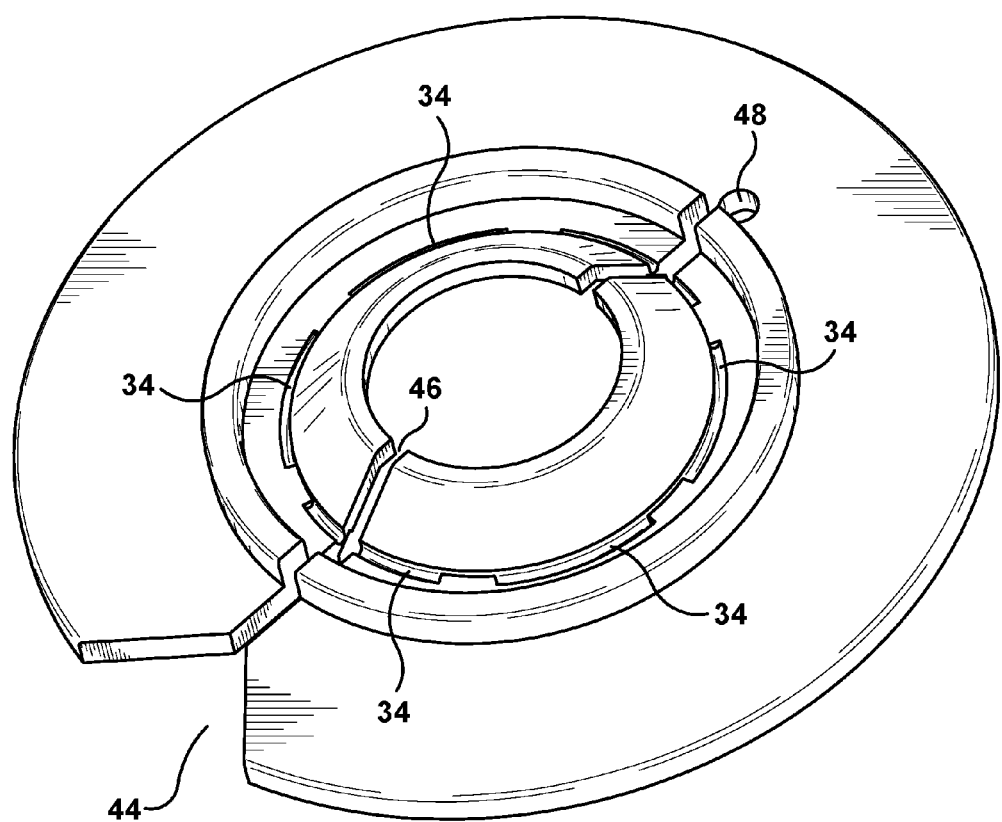
FIG. 2C illustrates a perspective view of the resilient member of FIG. 2A.

FIG. 2A illustrates the first resilient member 10 according to one example of the invention. The resilient member 10 is a unitary member comprising a single material. The first resilient member 10 has a central aperture 31.

The resilient member 10 has an annular flange 32 extending from a first side of the first resilient member 10 having a first diameter D1 at an apex 36 and a second diameter D2 at a base 38. The first diameter D1 is smaller than the second diameter D2. The thickness of the annular flange 32 is uniform from the apex 36 to the base 38. The first diameter D1 is about 0.75 inches. D1 is sized to provide near zero clearance between the outer diameter of the pushrod 14 and the first resilient member 10. Specifically for the second resilient member 12, the annular flange 32 is sized to fit around the weldment 26 at the proximate end of the push rod 14.

The first resilient member 10 includes a piloting ridge 42 extending from a first side of the first resilient member 10. The piloting ridge 42 has a larger circumference than the annular flange 32. The height of the piloting ridge 42 is set to about half of the diameter of the coil used in the biasing member 22. In one example, the height of the piloting ridge 42 is about equal to the diameter of the coil used in the biasing member 22. The height prevents the biasing member 22 from sliding over the first resilient member 10. The outer diameter of the piloting ridge 42 is D3, which is larger than D2. The piloting ridge 42 centers the biasing member 22 when the biasing member 22 is seated on the first resilient member 10 and second resilient member 12.

The first resilient member 10 includes a piloting projection 39. In this example, the piloting projection 39 has the outer diameter D3, the same as the piloting ridge 42. However, the diameter of the piloting projection 39 does not need to equal the diameter of the piloting ridge 42 in all applications. The diameter D3 of the piloting projection 39 is sized to fit within the diameter of the opening 20 in the end wall 18. The diameter D3 is about 1.50 inches.

The first resilient member 10 includes a collar 40 radially outward of the annular flange 32. The diameter D3 of the collar 40 is about 2.5 inches.

The first resilient member 10 is a flexible, unitary piece and can be made of a plastic material, such as glass filled nylon. The material selected should be durable yet also be flexible.

The first resilient member 10 includes at least one thinned section 34 between the outer diameter D2 of the annular flange 32 and the diameter D3 of the pilot projection 39 of the collar 40. The thickness of the at least one thinned section 34 is less than the thickness of the annular flange 32 and the other portions of the collar 40. As shown in FIG. 2B, the at least one section 34 has a thickness of less than half of the thickness of the annular flange 32. In one example, the thickness of the at least one section 34 is about 10% of the thickness of the annular flange 32. The at least one section 34 is designed in the manner of a living hinge. A living hinge is a thin flexible hinge or flexure bearing made from the same material as the two more rigid, thicker walled pieces it connects. The living hinge is typically thinned or cut to allow the more rigid pieces to bend along the line of the hinge. The living hinge encounters minimal friction and very little wear. As shown, the annular flange 32 has a thickness T1 adjacent to the at least one section 34. The living hinge has a thickness T2 at the thinnest portion of the at least one section 34. The living hinge may be shaped like a U as shown or may be shaped in accordance with industry design guidelines for living hinges on other applications. The thickness of the annular flange 32 returns to thickness T1 or greater by the second end 38. The thickness T2 allows controlled limited movement of the pushrod 14 around the axis A.

The pushrod 14 may move up to $^{+/-}4$ degrees from the axis A during normal operation of an S-cam drum brake with a slack adjuster. Since it is known that the axis A of the pushrod 14 will not always be installed or operate transversely of the service chamber 18, the limited motion allowed by the resilient members 10, 12 prevent the push rod 14 from adversely contacting the edges of the opening 20 of the service chamber or skewing the movable plate 24 against the interior of the service chamber 18, while allowing the pushrod 14 to operate within its normal angular range.

While it is preferable to have the first resilient member 10 and the second resilient member 12 have the exact same shape for economies of scale, the first resilient member 10 may be configured without the annular flange 32. The at least one section 34 may extend from the aperture 31 to the inner diameter of the collar 40.

As shown in FIG. 2C, the at least one section 34 may be a plurality of sections around the circumference of the annular flange 32. In one example, the plurality of sections 34 may be spaced at about thirty (30) degrees apart around the circumference of the annular flange 32. Alternatively, the at least one thinned section 32 may encompass the entire circumference radially outward of the annular flange 32.

In addition, the first resilient member 10 has a radial slit 46 extending from an enlarged angular void 44 at the outer circumference of the collar 40. An end of the slit 46 distal the angular void 44 is defined by an opening 48 having a thickness slightly larger than that of the slit 46 itself. The surfaces of the angular void 44 are oriented at roughly 65 degree to 115 degree angle relative to each other. Angles outside of the range noted are also acceptable.

When the angular surfaces of the void 44 press radially against the pushrod 14 during assembly, these surfaces cause the resilient member 10 to be circumferentially deformed as the resilient member 10 is twisted. A combination of the slit 46 and the void 44 engages the outer surface of the push rod 14 more broadly than a slit alone. A slit having such a cutout also does not require the same degree of slit expansion, thereby protecting the strength and integrity of the resilient member 10 itself.

Therefore, a unitary resilient member for a brake actuator comprises a central aperture; an annular flange surrounding the central aperture; and at least one section of the first resilient member radially outward from the annular flange having a thickness less than half of the thickness of the annular flange for constraining movement of the first resilient member in a radial direction.

Figure 3:
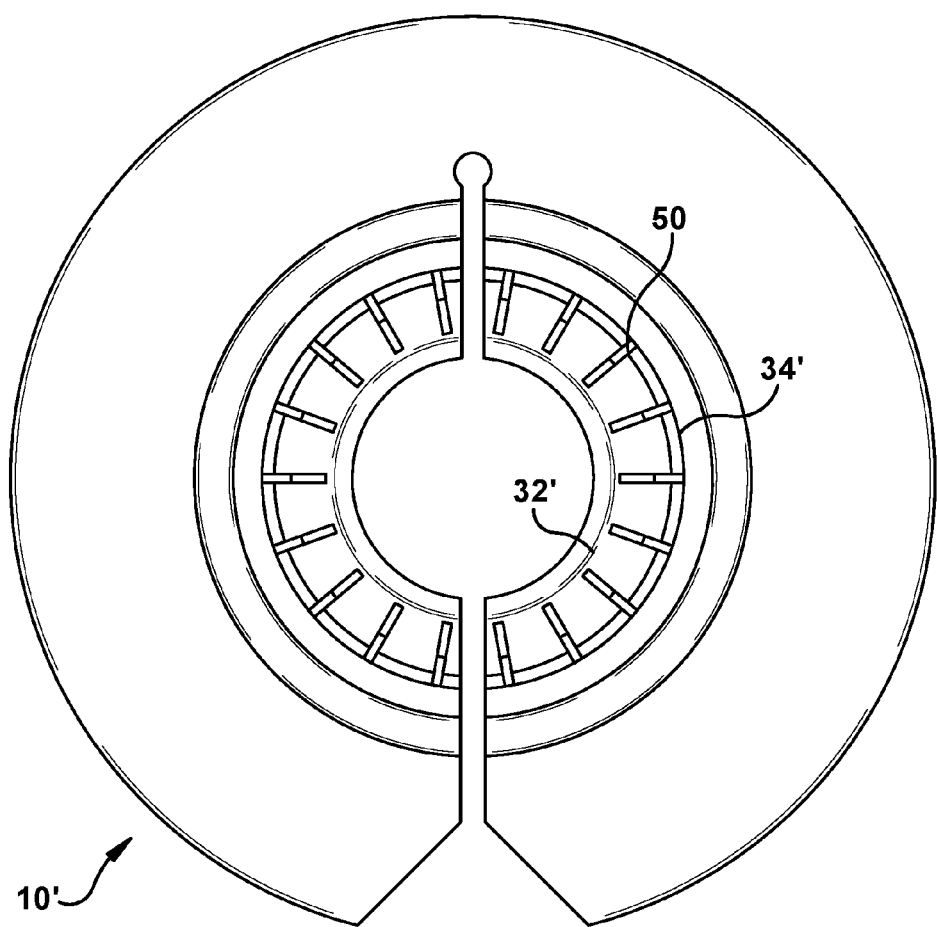
FIG. 3 illustrates a top view of a resilient member according to another example of the invention.

FIG. 3 illustrates a resilient member 10' according to another example of the invention. Resilient member 10' is similar in structure to the first resilient member 10. A plurality of thinned sections 34' surround the flange 32'. Slots 50 have been placed around the flange 32' at locations separating the thinned sections 34'. In this example, the thinned sections 34' are placed approximately every 20 degrees around the circumference of the flange 32'. The combination of the thinned sections 34' and the slots 50 make the resilient member 10' more flexible during operation of the brake actuator.

Figure 4:
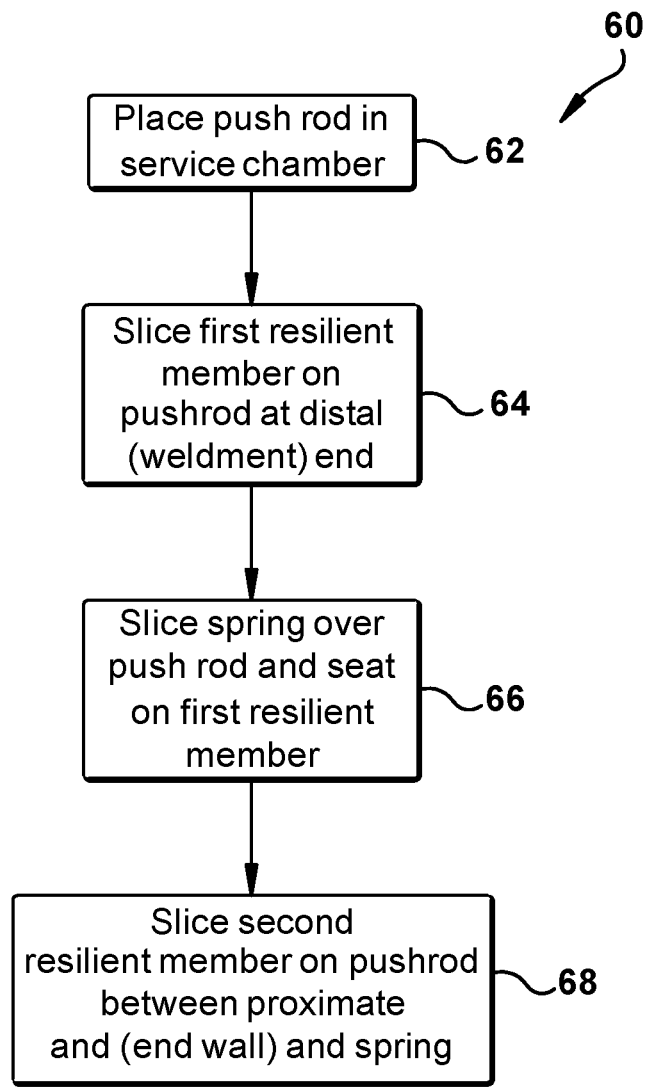
FIG. 4 illustrates a method of assembling a brake actuator, according to one example of the invention.

FIG. 4 illustrates a method 60 of assembling the brake actuator according to one example of the invention. In step 62, the biasing member 22 is placed in the service chamber 18. In step 64, the first resilient member 10 is slid onto the pushrod 14 by pushing the void 44 against the surface of the pushrod 14 at the pushrod distal end. In step 66, the second resilient member 12 is slide onto the pushrod 14 at the proximate end and over the weldment 26 so that the annular flange of the second resilient member 12 seats flush on the weldment 26.

In the final step 68, the pushrod 14 is slid into the service chamber 18 until the spring is seated on the piloting protrusions of the first resilient member 10 and the second resilient member 12. Therefore, first resilient member 10 and the second resilient member 12 center the spring around the axis of the pushrod and restrict contamination into the service chamber.

Therefore, a method of centering a spring in a spring brake chamber comprises placing a spring in a spring brake chamber; sliding a first resilient member on a distal end of a push rod; sliding a second resilient member on a proximate end of the push rod; and sliding the pushrod into the service chamber until the spring is seated on the first resilient member and the second resilient member.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A brake actuator comprising:
   a brake actuator housing, the brake actuator having an end wall;
   a pushrod having an axis, the pushrod projecting through an opening in the end wall and terminating at a movable plate located in the housing;
   a spring enclosed in the housing and surrounding the pushrod; and
   a first resilient member, the first resilient member comprising:
      a central aperture;
      an annular flange surrounding the aperture, the annular flange having a first diameter at an apex of the annular flange and a second diameter at a base of the annular flange, wherein the second diameter is larger than the first diameter; and
      a collar radially outward of the annular flange, the collar having an inner diameter connecting with the base of the annular flange with at least one section having a thickness less than half of the thickness of the annular flange for constraining movement of the spring and the push rod in a radial direction; a piloting projection on second side of the first resilient member opposite the first side having approximately the same diameter as the opening in the end wall; and a piloting ridge on the first side of the first resilient member having an outer diameter sized for seating the spring; wherein the first resilient member is disposed on the pushrod proximate to the end wall and the piloting diameter of the collar partially extends through the opening in the end wall for centering the spring around the axis of the pushrod and restricting contamination into the brake actuator housing.

2. The brake actuator as in claim 1, further comprising: a second resilient member, wherein the second resilient member is disposed on the pushrod proximate to the movable plate and cooperates with the first resilient member to center the spring with respect to the axis of the pushrod.

3. The brake actuator as in claim 2, wherein the shape of the first resilient member and the second resilient member is identical.

4. The brake actuator as in claim 2, the movable plate further comprising a weldment; wherein the annular flange of the second resilient member surrounds the weldment when the second resilient member is seated on the movable plate.

5. The brake actuator as in claim 1, wherein the first resilient member is a plastic material.

6. The brake actuator as in claim 1, wherein the at least one section of the collar has a thickness of about 10% of the thickness of the annular flange.

7. The brake actuator as in claim 1, wherein the at least one section of the collar comprises a plurality of sections spaced at about thirty degrees apart around the circumference of the annular flange.

8. The brake actuator as in claim 1, wherein the spring is a barrel spring.

9. A unitary resilient member for a brake actuator comprising:
   A central aperture;
   an annular flange surrounding the aperture, the annular flange having a first diameter at an apex of the annular flange and a second diameter at a base of the annular flange, wherein the second diameter is larger than the first diameter; and
   a collar radially outward of the annular flange, the collar having an inner diameter connecting with the base of the annular flange with at least one section having a thickness less than half of the thickness of the annular flange for constraining movement of the resilient member in a radial direction; a piloting projection on second side of the first resilient member opposite the first side having approximately the same diameter as the opening in the end wall; and a piloting ridge on the first side of the first resilient member.

10. The unitary resilient member as in claim 9, wherein the unitary resilient member further comprises a piloting ridge surrounding the annular flange.

11. The unitary resilient member as in claim 9 wherein the unitary resilient member is a plastic material.

12. The unitary resilient member as in claim 9, wherein the at least one section of the collar has a thickness of about 10% of the thickness of the annular flange.

13. The unitary resilient member as in claim 9, wherein the at least one section comprises a plurality of sections spaced at about thirty degrees apart around the circumference of the annular flange.

14. The unitary resilient member as in claim 9, the unitary resilient member further comprising a slot extending through about 75% of the unitary resilient member beginning at the outer diameter of the collar, through the inner diameter of the collar, the annular flange and the central aperture.

15. The unitary resilient member as in claim 9, wherein the at least one section comprises a plurality of sections and the unitary resilient member further comprises a plurality of slots located around the circumference of the annular flange and separating the plurality of sections.

16. The method of centering a spring in a brake actuator comprising:
   Placing a spring in a brake actuator housing;

Sliding a first resilient member on a distal end of a push rod; the first resilient member having a central aperture; an annular flange surrounding the aperture; a collar radially outward of the annular flange, the collar having an inner diameter connecting with the base of the annular flange with at least one section having a thickness less than half of the thickness of the annular flange for constraining movement of the resilient member in a radial direction; a piloting projection on second side of the first resilient member opposite the first side; and a piloting ridge on a first side of the first resilient member;

Sliding a second resilient member on a proximate end of the push rod; and

Sliding the pushrod into the brake actuator housing until the spring is seated on the first resilient member piloting projection outer diameter and the second resilient member.

\* \* \* \* \*